United States Patent [19]
Gable et al.

[11] Patent Number: 6,128,433
[45] Date of Patent: Oct. 3, 2000

[54] CONTROLLING FREQUENCY DRIFT OF A DIGITAL VIDEO TAPE DRIVE

[75] Inventors: Melvin Gable, Cowan Heights; William Caldwell, Fountain Valley, both of Calif.

[73] Assignee: Indigita Corporation, Irvine, Calif.

[21] Appl. No.: 09/001,743

[22] Filed: Dec. 31, 1997

[51] Int. Cl.[7] ........................................... H04N 5/76
[52] U.S. Cl. ................... 386/87; 386/90; 386/112
[58] Field of Search ........................... 386/109, 112, 386/80, 84, 66, 85, 90, 114, 113, 98, 14, 78, 79, 86–87; 360/73.01, 73.09, 73.11, 73.12, 73.13, 73.14, 73.08, 9.1, 10.3, 10.1, 87, 58

[56] References Cited

U.S. PATENT DOCUMENTS

| | | | |
|---|---|---|---|
| 4,656,537 | 4/1987 | Toba et al. | 360/73 |
| 4,716,473 | 12/1987 | Kondo | 360/9.1 |
| 5,220,736 | 6/1993 | Ando | 360/10.3 |
| 5,353,172 | 10/1994 | Alioth . | |
| 5,392,163 | 2/1995 | Higuchi et al. | 360/10.1 |
| 5,729,516 | 3/1998 | Tozaki et al. | 369/58 |
| 5,758,010 | 5/1998 | Ando | 386/87 |
| 5,892,633 | 4/1999 | Ayres et al. | 360/73.08 |
| 5,917,988 | 6/1999 | Eto . | |
| 5,974,225 | 10/1999 | Iwamoto et al. . | |
| 6,011,899 | 1/2000 | Ohishi et al. | 386/98 |

FOREIGN PATENT DOCUMENTS 0 740 298  10/1996  European Pat. Off. ........ G11B 15/18

*Primary Examiner*—Thai Tran
*Attorney, Agent, or Firm*—Fish & Richardson P.C.

[57] ABSTRACT

A digital video tape drive and a method of controlling frequency drift in the tape drive. The tape drive includes a helical scan recorder in which the recording drum motor and the capstan motor are synchronized to the frequency of a long-term reference clock derived from a reference signal (e.g. an MPEG program clock reference (PCR) signal or system clock reference (SCR) signal) embedded in digital video data to be recorded by the tape drive. The drum motor is also phase locked to the long-term reference clock signal. In addition, the drum motor is synchronized to a reference clock derived from the reference signal during playback of the digital video data.

11 Claims, 5 Drawing Sheets

CONTROLLING FREQUENCY DRIFT OF A DIGITAL VIDEO TAPE DRIVE

TECHNICAL FIELD

This invention relates to recording and playing digital video data and, more particularly, to controlling frequency drift of a digital video tape drive during recording and playback of video data.

BACKGROUND INFORMATION

MPEG defines a set of standards for video compression algorithms commonly used by the broadcast and studios for recording and broadcasting digital encoded video. The broadcast industry immediately recognized the potential of MPEG technology to increase channel efficiency of satellite transponders and cable networks. The MPEG video and audio specifications give the syntax and semantics of encoded video and audio bitstreams necessary for communicating compressed digital audiovideo data, as well as storing such data on media in a standard format. To date, two standards have been announced, ISO/ANSI MPEG1 and MPEG2.

Referring to FIG. 1, a conventional prior art MPEG digital video receiver/decoder 30 receives an encoded digital video signal 34, such as an ISO/ANSI MPEG1 or MPEG2 encoded signal, from a transmission channel 32. A channel specific decoder 36 removes the transmission encoding and delivers an MPFG-encoded signal 38 to an MPEG specific decoder 40. The MPEG specific decoder 40 separates the MPEG-encoded signal into an encoded video signal 42 and an encoded audio signal 44. A video decoder 46 and an audio decoder 48 decode the encoded video and audio signals 42 and 44 to produce digital video and audio signals 50 and 52, respectively.

Digital video encoders must be highly accurate in limiting frequency drift of system clocking signals so that decoders receiving digital video data from the encoders may use such clocking signals to recover encoded video data accurately. For digital video signals in the conventional MPEG formats, the system clock in a typical video encoder must meet the following bounds on its frequency:

Nominal Frequency=90 KHZ

Frequency Drift≦±14.5 Hz

Rate of Change of Frequency Drift<0.00025 Hz/s

For best performance, both the bounds on absolute frequency drift and rate of change of frequency drift must be maintained for accurate recording and playback of digital video.

In theory, a digital video tape drive onto which decoded video data is to be recorded should maintain a similar degree of accuracy to ensure that video decoder buffers do not overflow or underflow as video data is decoded during playback. (Simply increasing the size of the decoding buffers to prevent overflow will increase the cost of the system). The tape drive also should maintain very accurate timing during the recording process to ensure proper video playback.

Referring to FIG. 2, a typical video recording/playback system 10 (either analog or digital) includes a video receiver 12 that receives a video signal and processes the signal (e.g., by demodulating it) into a form suitable for recording. The video receiver 12 provides the processed video signal as input to a video recording/playback device, such as a helical scan recorder 14, which records the processed video signal onto a recording medium, such as a video tape 16. A helical scan recording drum 18 driven by a drum motor 19 records the processed video signal onto the video tape 16 as the tape 16 is pulled past the drum 18 by a capstan 20 driven by a capstan motor 21. During playback, the drum 18 retrieves the recorded video signal from the video tape 16 and provides the video signal to a playback circuit 24, which in turn provides an analog video signal to a video display device 26, such as a television monitor. The drum motor 19 controls the rotational speed of the drum 18 and, therefore, the data transfer rate of the recorder 14. The capstan motor 21 controls the rotational speed of the capstan 20 and, therefore, the pitch of the video tracks recorded on the tape 16.

Conventional analog and digital video tape drives maintain accuracy in frequency drift by synchronizing the drum motor 19 and the capstan motor 21 to the eventual analog display rate of the video frames recorded on the tape 16. For example, conventional analog VHS and Beta video recorders use a frame-to-frame recording process in which each picture frame is recorded on an individual analog track at a rate of 30 Hz for video encoded according to the NTSC standard and 25 Hz for video encoded according to the PAL standard. For NTSC-encoded video, each frame consists of two fields that are displayed at a rate of 60 Hz. Analog video tape drives minimize frequency drift by using a tracking control circuit that locks the video track frequency to the recording/playback line frequency, which is 60 Hz for NTSC and 50 Hz for PAL. However, this technique will not allow digital data to be recorded at different video display rates.

Digital video tape drives also typically minimize frequency drift by operating at a fixed frame transfer rate and locking the video track recording rate to the line frequency. However, this method requires a fixed record/playback rate and does not support different display rates.

The inventors have recognized a need for controlling frequency drift of a digital video tape drive, particularly for such a drive having a variable display rate and interframe compressed video where there is no relationship between track rate and frame display rate. The present invention addresses this need.

SUMMARY

The invention features a digital video tape drive and a method of controlling frequency drift in the tape drive. The tape drive includes a helical scan recorder in which the recording drum motor and the capstan motor are synchronized to the frequency of a long-term reference clock (e.g., a 25 Hz clock) derived from a reference signal (e.g., an MPEG program clock reference (PCR) signal or system clock reference (SCR) signal) embedded in digital video data to be recorded by the tape drive. The drum motor is also phase locked to the long-term reference clock signal. In addition, the drum motor is synchronized to a reference clock derived from the reference signal during playback of the digital video data.

In one embodiment, the drum motor is synchronized by converting its 1800 Hz frequency pulse output signal into a 25 Hz reference signal and then using a frequency and phase-lock circuit to synchronize the 25 Hz reference signal to the 25 Hz long-term reference clock derived from the decoder's PLL 27 MHz PCR clock reference. Similarly, the capstan motor is synchronized by converting its 1400 Hz frequency pulse output signal into a 25 Hz reference signal and using a frequency lock circuit to synchronize this 25 Hz reference signal to the long-term reference clock.

One aspect of the invention includes a method of controlling frequency drift of a digital video tape drive comprising: receiving a reference clock corresponding to a reference signal embedded within digital video data to be recorded; deriving a long-term reference clock from the received reference clock; synchronizing a recording drum motor of a helical scan recorder to the long-term reference clock; and recording the digital video data onto a recording medium by means of the helical scan recorder. The invention includes related apparatus.

Advantages of the invention include one or more of the following:

A digital video tape drive may ensure low frequency drift using a mechanism that is independent of encoded program material and video display rate.

The digital video tape drive may be used in applications in which the video display rate is other than the conventional analog NTSC and PAL rates. In particular, the tape drive may be used in applications in which various MPEG frequencies are used.

The digital video tape drive may support different aspect ratios and picture resolutions.

Low frequency drift may be achieved during both recording and playback of digital video data in applications, such as MPEG applications, having various display frequencies.

The details of one or more embodiments of the invention are set forth in the accompanying drawings and the description below.

DESCRIPTION OF DRAWINGS

Like reference numbers and designations in the various drawings indicate like elements.

DETAILED DESCRIPTION

Throughout this description, various frequencies and rotation rates are stated that are in common usage with MPEG decoding systems and for commonly available basic recording mechanisms. However, the principles of the invention apply to other frequencies and rotation rates.

The level of compression (i.e., bits per frame) varies in MPEG encoded video material. Hence, there is no direct relationship between the data stream rate and picture frame rate. To obtain a reference to video frames, the MPEG standards provide a time-stamp mechanism that ensures synchronization of audio and video. The MPEG1 standard defines two parameters used by an MPEG decoder: a system clock reference (SCR) and a presentation time stamp (PTS). The MPEG2 standard adds a program clock reference (PCR) that is equivalent to the SCR. Both the SCR and PCR have a frequency of 27 MHz. The SCR and PCR values are a snapshot of the encoder system clock.

Figure 1:
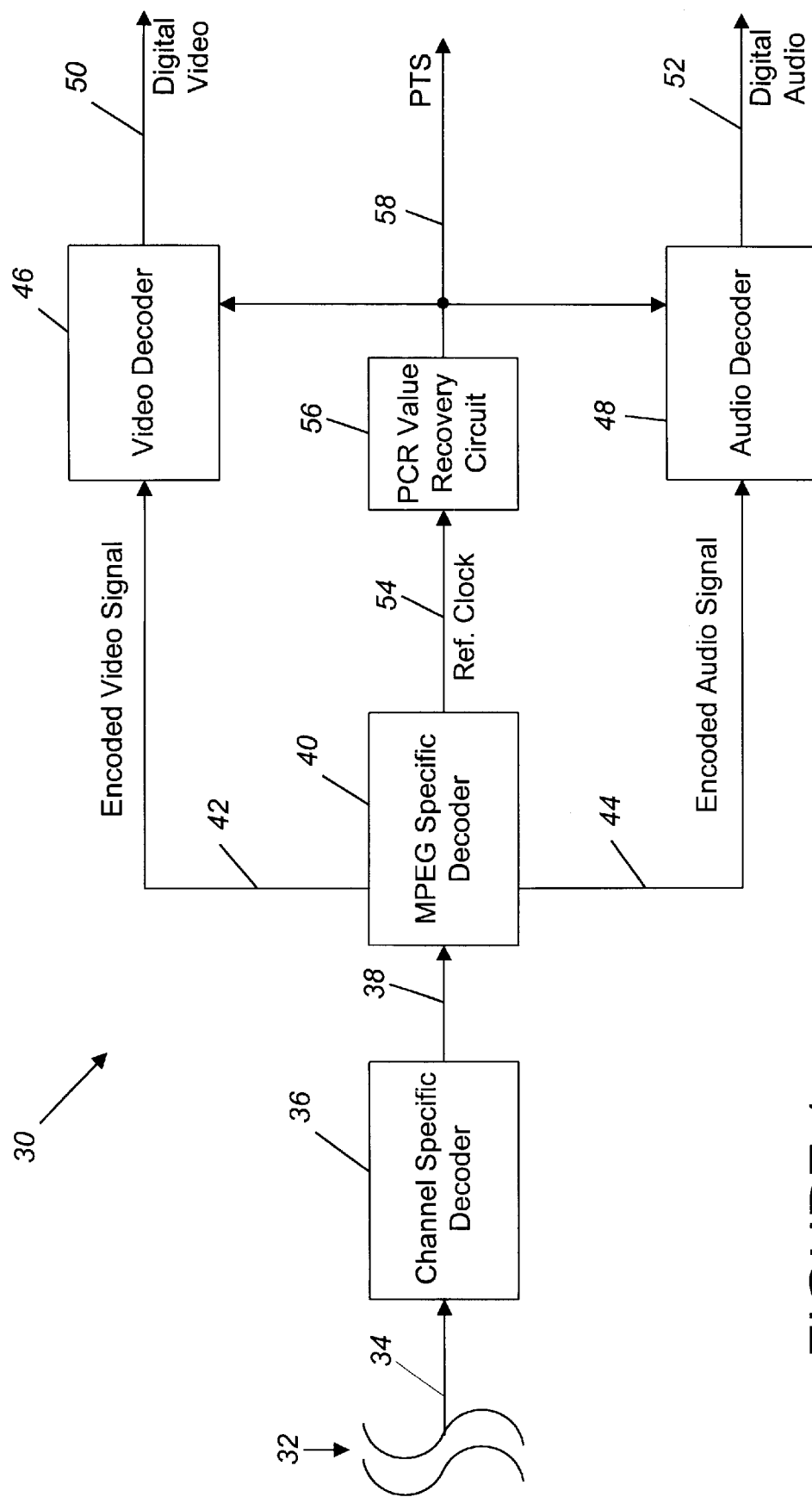
FIG. 1 is a schematic diagram of a prior art MPEG video receiving/decoding system.
Figure 2:
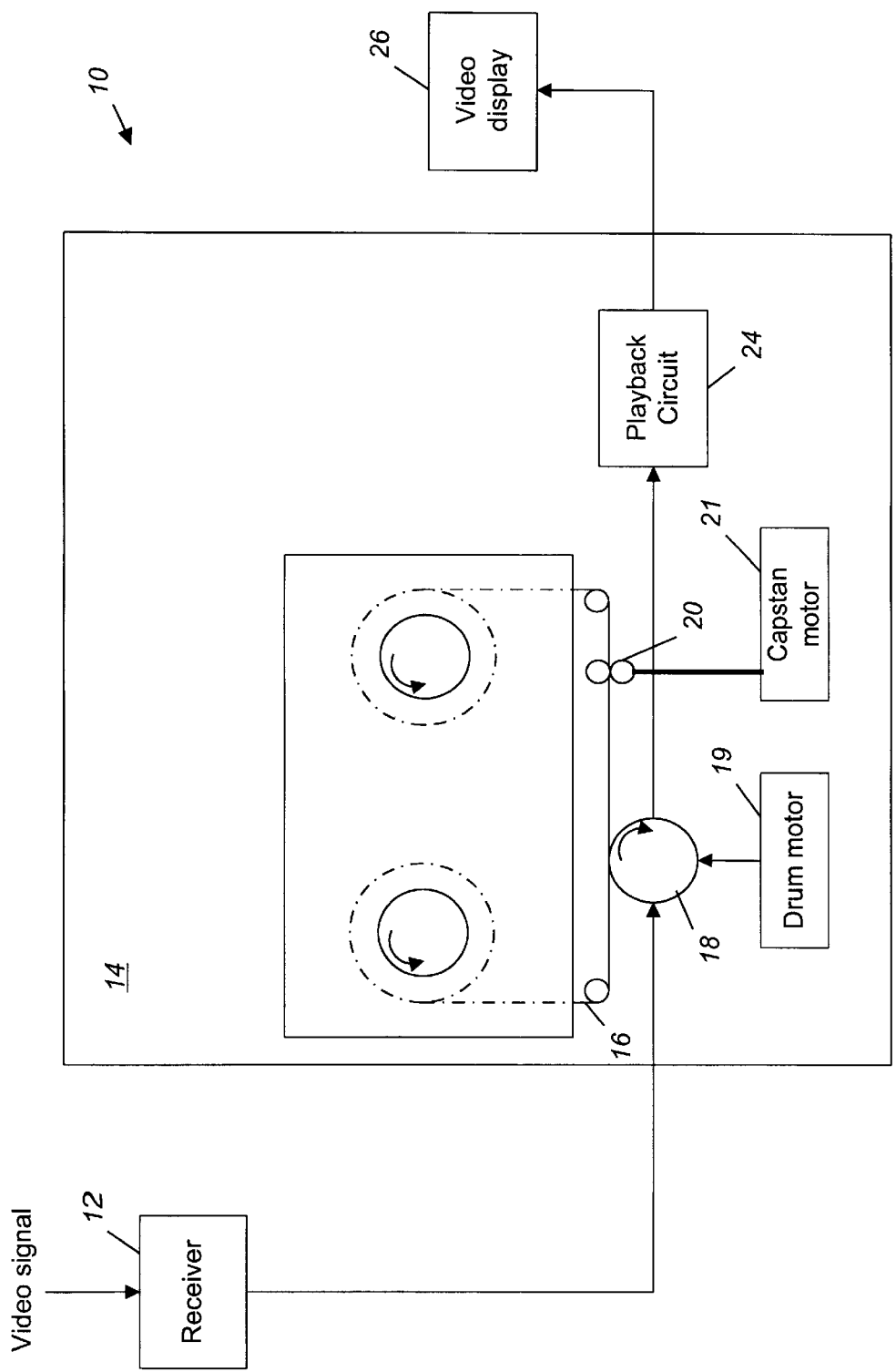
FIG. 2 is a schematic diagram of a prior art video recording/playback system.

Referring to FIG. 1, the MPEG specific decoder 40 recovers a reference clock signal 54 embedded in the MPEG-encoded signal 38 (the decoder 40 is phase locked to the encoder's clock signal). In the illustrated embodiment, the reference clock signal 54 is the embedded PCR signal provided by a standard MPEG encoder. A PCR value recovery circuit 56 receives the reference clock signal 54 from the MPEG specific decoder 40 and recovers from the signal 54 an instantaneous value 58 of the MPEG encoder's PCR. The video decoder 46 and the audio encoder 48 use the PCR value 58 to set internal reference clocks. The PCR value 58 also may be used as a presentation time stamp (PTS) to be recorded with each track of video and audio data. The PTS represents the time at which the video picture is to be displayed or the starting playback time for the audio time sequence. An alternative to the PCR signal is the SCR signal provided under the MPEG1 and MPEG2 standards.

Figure 3:
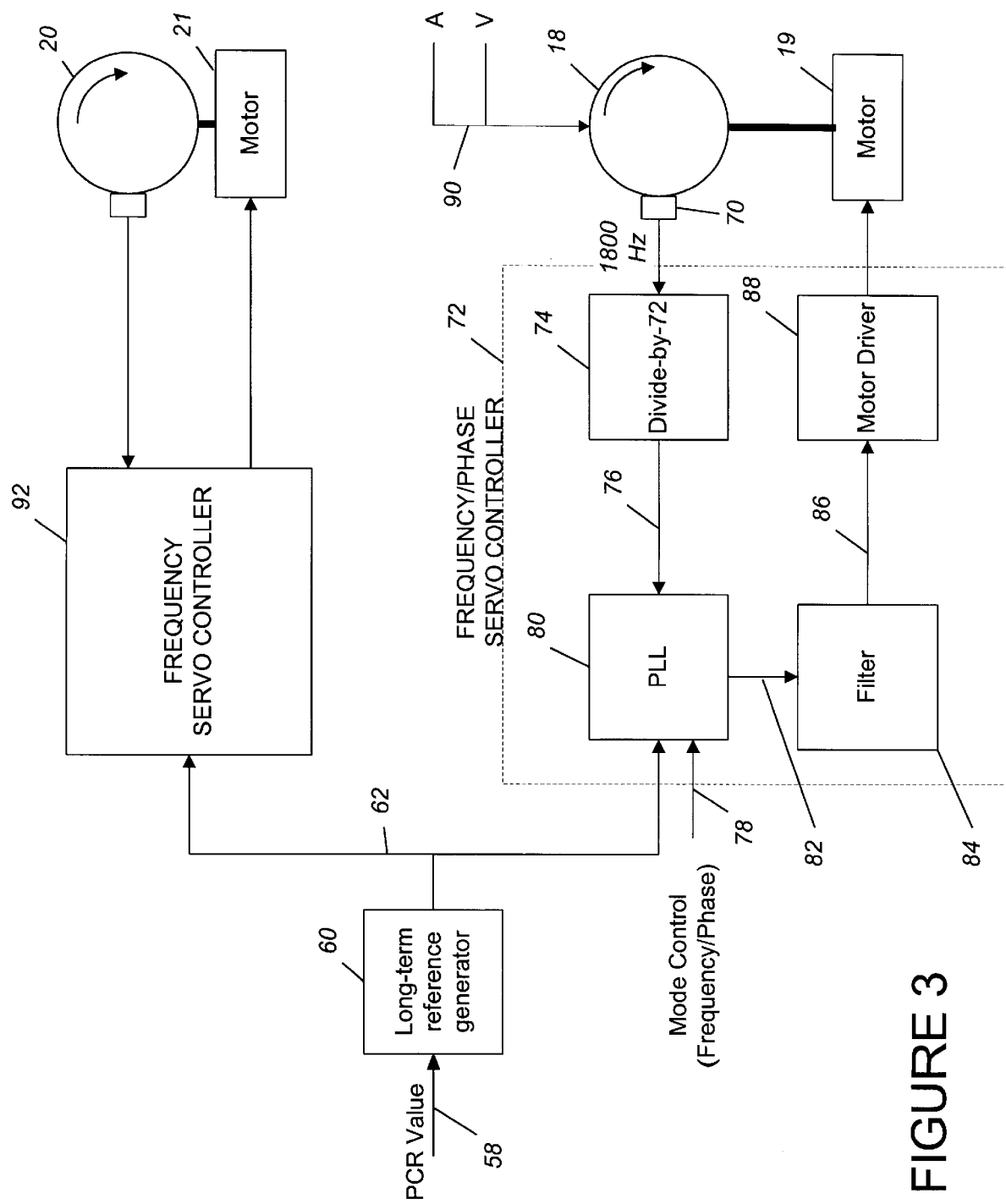
FIG. 3 is a schematic diagram of a system for controlling the frequency drift of a digital video tape drive during recording.

Referring to FIG. 3, the PCR value 58 recovered by the recovery circuit 56 of FIG. 1 is used to control the frequency drift of a digital video recorder recording digital video data (including any corresponding audio data) onto a digital recording medium, such as a digital video tape. Such a recorder would record, for example, an MPEG-encoded signal after transmission decoding. The PCR value 58 is provided to a long-term reference generator 60, which uses the PCR signal to create a low frequency (e.g., 25 Hz) long-term reference clock signal 62, as described below, to which the drum motor 19 and the capstan motor 21 are synchronized. In addition, the drum motor 19 is phase locked to the long-term reference clock signal 62.

More particularly, for the drum 18, two stages of control are implemented during recording. First, a servo controller is used during a frequency acquisition mode (velocity mode) to lock the speed of the drum motor 24 to the reference frequency. At this point, the drum 18 is locked to within about 1 Hz of the reference frequency. Second, the servo controller is used during a phase lock mode to compare the phase of the reference frequency to the phase of the drum frequency (divided down to the same nominal value as the reference frequency). The precise phase difference is determined and a correction signal is generated to cause the drum 18 to be exactly phase locked to the reference frequency. In the preferred embodiment, the drum 18 is also frequency and phase locked to the reference frequency during playback, but could be frequency locked only.

In the preferred embodiment, the capstan 20 is frequency locked to the reference frequency during recording, but during playback is frequency locked to a sync/tracking signal recorded on the tape.

Referring again to FIG. 3, in the illustrated embodiment, the drum 18 is driven by a drum motor 19 that has, in the illustrated embodiment, a nominal rotation rate of 1800 Hz. A rotation sensor 70 monitoring the drum 18 provides a frequency pulse output of 1800 Hz to a frequency/phase servo controller 72. The frequency pulse output is coupled to a "divide-by-72 circuit" 74, which reduces the frequency pulse output of the drum 18 to a divided signal 76. In other words, the frequency pulse output divided by a division factor must approximate the frequency of the reference clock signal 62.

During a first stage of synchronization, determined by a mode control signal 78, a phase-locked loop circuit 80 frequency locks the divided signal 76 to the long-term reference signal 62 and provides an output correction signal 82 to a filter 84 that integrates the error signal and provides the correct overall damping and gain characteristics of the phase locked loop. The filtered correction signal 86 is applied to a motor driver 88 which controls the speed of the drum motor 19. The drum motor 19 in turn controls the rotational speed of the drum 18 and, therefore, the recording rate of digital audiovideo data 90.

During a second stage of synchronization, determined by the mode control signal 78, the servo controller 72 phase locks the drum 18 to the long-term reference signal 62, as described above.

More particularly, the first stage of synchronization locks the divided signal 76 to the reference signal 62 within one cycle of the reference signal frequency, while the second stage of synchronization locks to the exact phase of that one cycle. This process of frequency and phase locking the drum 18 to the long-term reference signal 62 ensures that the long term transfer rate of the tape drive is held to a very stable rate over the total record time of the digital video program.

Similarly, in the illustrated embodiment, the capstan 20 provides a frequency pulse output of 1400 Hz to a frequency servo controller 92. The frequency servo controller 92 provides only first stage frequency synchronization of the capstan motor 21 against a reference frequency, but otherwise operates in a fashion similar to the frequency/phase servo controller 72. This process ensures a very accurate track pitch which establishes the number of tracks recorded per millimeter of tape movement, and thus establishes the overall tape usage for the recorded digital video program and maintains an accurate maximum record time on a tape cartridge. In the preferred embodiment, the capstan 20 is frequency locked to the long term reference frequency 62 during recording, but during playback is frequency locked to a conventional sync/tracking signal recorded on the tape.

As noted above, the drum rotational rate (RPM) sets the data transfer rate of the tape drive. The capstan rotational rate establishes the track pitch which is recorded on the tape and hence, determines the total capacity on the tape cartridge. Similarly, the tape speed compared to the overall length of the tape in the cartridge determines the maximum record time on the cartridge. This method establishes both an accurate record time and data capacity for the recording process on the tape.

Figure 4:
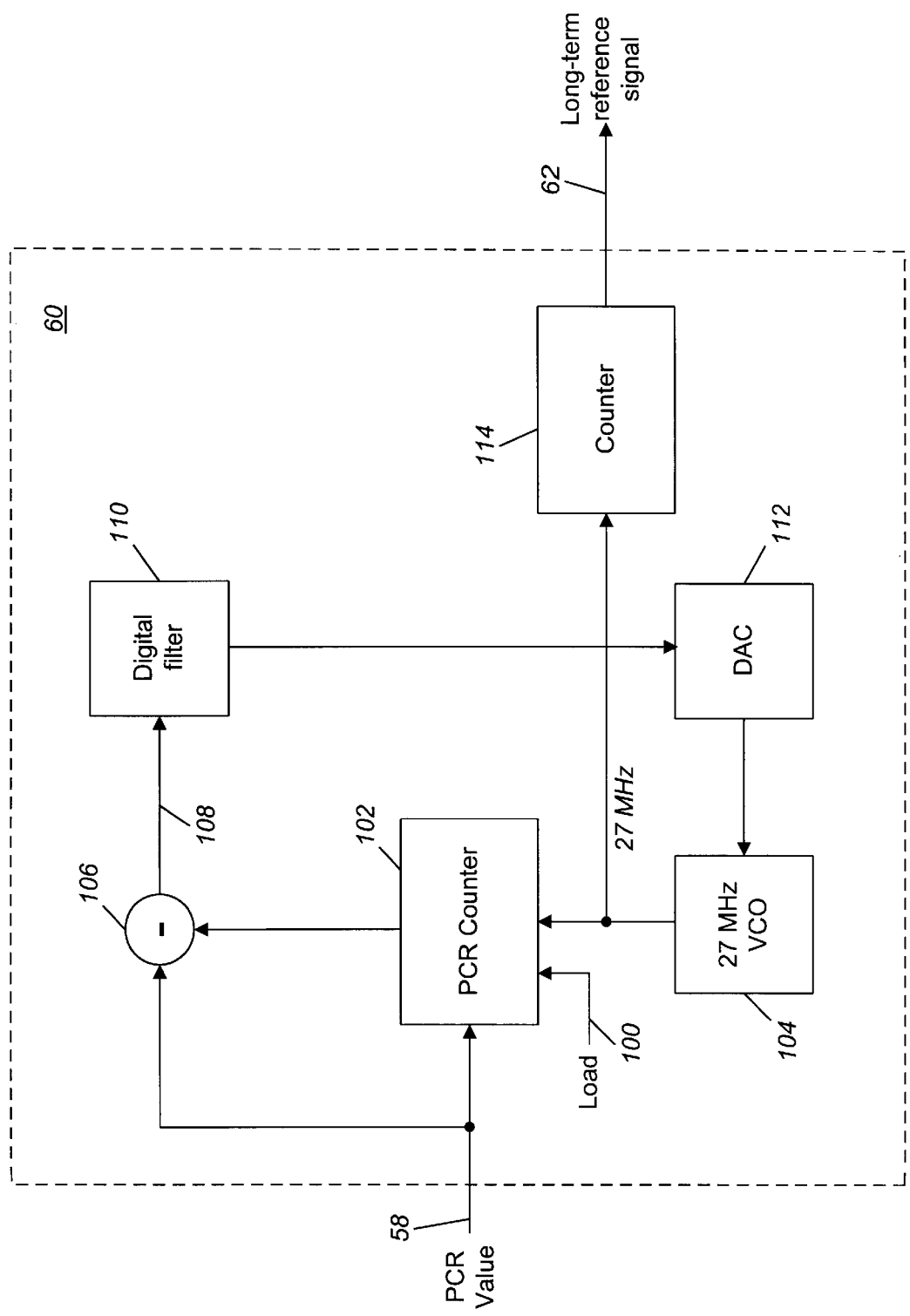
FIG. 4 is a schematic diagram of a long-term reference clock generator for the system of FIG. 3.

FIG. 4 is a schematic diagram of one embodiment of a long-term reference clock generator for the system of FIG. 3. The long-term reference generator 60 uses the PCR value 58 recovered by the receiver/decoder system 30 of FIG. 1 to generate the long-term reference signal 62. When the PCR value 58 is first captured, the receiver/decoder system 30 generates a load signal 100 that is used by the long-term reference generator 60 to load the initial PCR value into a PCR counter 102. A voltage-controlled oscillator (VCO) 104 generates a nominal 27 MHz signal that is used to increment the PCR counter 102. Ideally, the nominal 27 MHz signal tracks the 27 MHz reference clock 54 (FIG. 1) embedded in the MPEG-encoded signal 38 so that the instantaneous value in the PCR counter 102 always matches the actual PCR value 58. However, because the value in the PCR counter 102 and the actual PCR value 58 may disagree at times, the instantaneous difference between the two digital values is used to adjust the VCO 104. To this end, a digital adder 106 subtracts the value in the PCR counter 102 from the actual PCR value 58 and generates a difference signal 108. The difference signal 108 is passed through a digital filter 110 and a digital-to-analog converter (DAC) 112, and the resulting analog difference signal is used to regulate the nominal 27 MHz output signal of the VCO 104. The nominal 27 MHz output signal then is provided to a counter 114 that generates the long-term reference signal 62.

Figure 5:
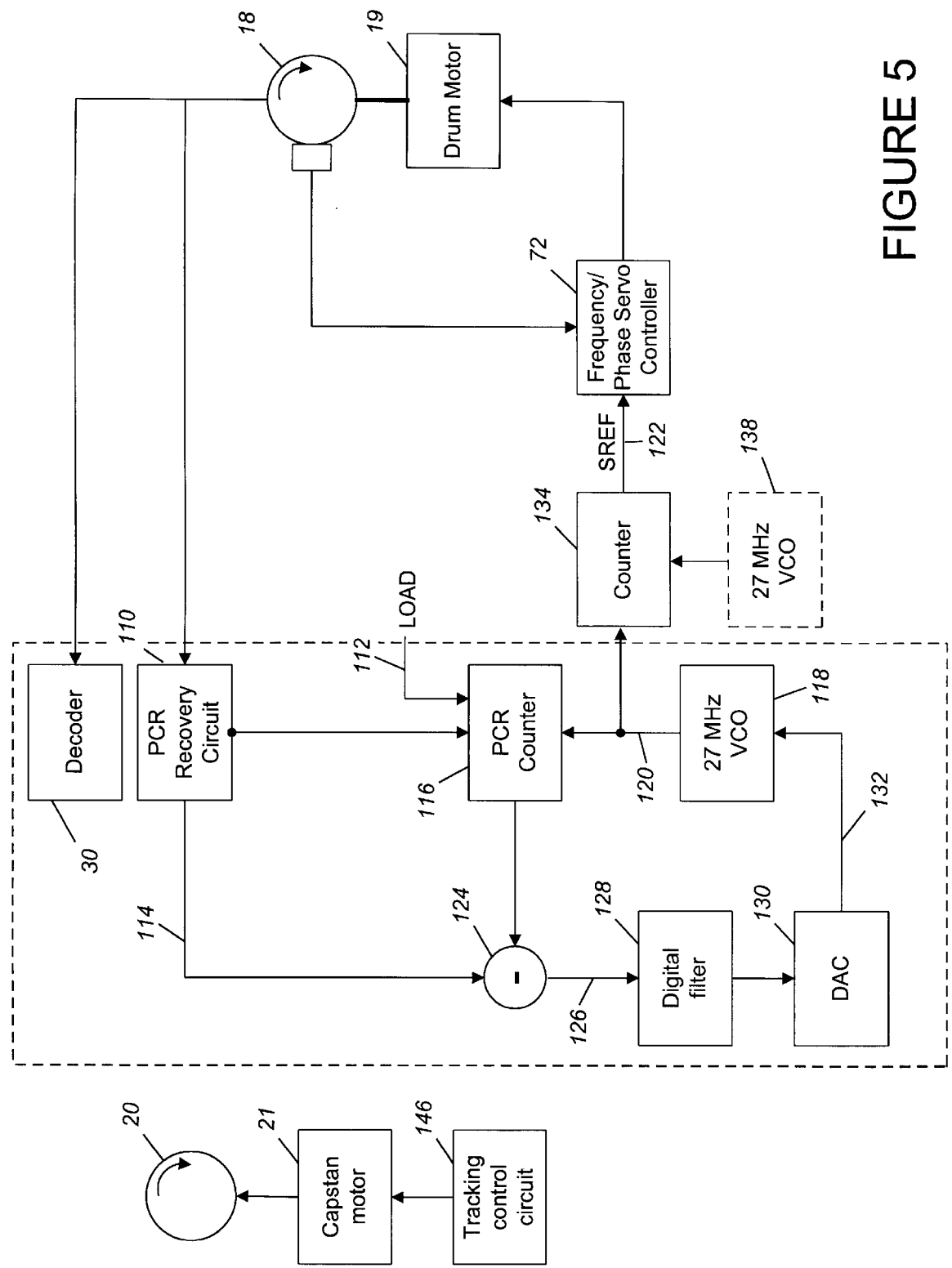
FIG. 5 is a schematic diagram of a system for controlling the frequency drift of a digital video tape drive during playback.

Referring now to FIG. 5, during playback the helical scan drum 18 reads the recorded digital audiovideo data from the tape medium and provides the data to a conventional receiver/decoder system 30 which in turn generates an analog video signal and provides the analog video signal to a display device (not shown). The drum 18 also provides the digital video data to a PCR recovery circuit 110 that retrieves recorded PCR values 114 from the video data. A load signal 112 is generated when the drum 18 retrieves the first video track and is used to load the initial PCR value into a PCR counter 116. A voltage-controlled oscillator (VCO) 118 generates a nominal 27 MHz signal 120 that is used to increment the PCR counter 116. A digital adder 124 subtracts the instantaneous value in the PCR counter 116 from the actual PCR value 114 to generate a difference signal 126. The difference signal 126 is passed through a digital filter 128 and a digital-to-analog converter (DAC) 130, and the resulting analog difference signal 132 is used to govern the nominal 27 MHz output signal 120 of the VCO 118.

In the illustrated embodiment, a counter 134 converts the nominal 27 MHz output signal into a 25 Hz long-term reference signal 122, which is used to limit the frequency drift of the drum motor 19 by means of a frequency/phase servo controller 72 of the type shown in FIG. 3. The output of the servo controller 72 is used to control rotational speed of the drum 18 and, therefore, the rate of the digital video playback stream.

In the preferred embodiment, the capstan motor 21 (and thus the capstan 20) is controlled by a conventional tracking control circuit 146 to maintain tracking with the helical-scanned recorded video tracks on the recording medium. Frequency and phase locking the drum motor 19 maintains an accurate transfer rate of the recorded digital video during playback. However, frequency locking alone for the drum motor 19 may be used.

In a variation of the embodiment shown in FIG. 5, during recording, the nominal 27 MHz signal 120 signal can be obtained as an input from a 27 MHz VCO 138 within the receiver/decoder system 30 rather than from the VCO 118. In still another embodiment, the receiver/decoder system 30 can use the 27 MHz signal 120 of the VCO 118 as a system reference clock.

In the preferred embodiment, each recorded track contains a time-stamp within a subcode group field in which the running internal PCR signal is stored during the recording process. In one embodiment, tracks are written at the rate of 200 tracks per second. The time-stamp is used to fine tune the actual transfer rate of the video data across the interface of the tape drive to the receiver/decoder system 30. The track time-stamp value is compared against an internal reference clock which is running off the 27 MHz reference frequency. Any differences between the track time-stamp value and the internal reference clock of the receiver/decoder system 30 is used to adjust the "consumption" rate of the digital video stream, in known fashion.

A number of embodiments of the present invention have been described. Nevertheless, it will be understood that various modifications may be made without departing from the spirit and scope of the invention. For example, while the preferred embodiment monitors the rotational speed of the drum 18 or capstan 20, the rotational speed of the respective drum motor 19 or capstan motor 21 could be monitored. Accordingly, it is to be understood that the invention is not to be limited by the specific illustrated embodiment, but only by the scope of the appended claims.

What is claimed is:

1. A method of controlling frequency drift of a digital video tape drive, the method comprising:

(a) receiving a reference clock corresponding to a first reference signal embedded within digital video data to be recorded;

(b) deriving a long-term reference clock from the received reference clock;

(c) synchronizing a recording drum motor of a helical scan recorder to the long-term reference clock by:

(1) generating a drum speed signal corresponding to the rotational speed of the recording drum motor;

(2) generating from the drum speed signal a second reference signal having a frequency approximately equal to the frequency of the long-term reference clock;

(3) frequency and phase synchronizing the second reference signal to the long-term reference clock; and (4) applying the synchronized second reference signal to frequency and phase synchronize the recording drum motor; and (d) recording the digital video data onto a recording medium by means of the helical scan recorder.

2. The method of claim 1, wherein deriving a long-term reference clock comprises reducing the frequency of the reference clock.

3. The method of claim 1, further comprising synchronizing a capstan motor of the helical scan recorder to the long-term reference clock.

4. The method of claim 3, wherein synchronizing the capstan motor comprises:

(a) generating a pulse signal corresponding to the rotational speed of the capstan motor;

(b) generating from the pulse signal a reference signal having a frequency approximately equal to the frequency of the long-term reference clock;

(c) synchronizing the reference signal to the long-term reference clock; and (d) applying the synchronized reference signal to synchronize the capstan motor.

5. The method of claim 1, wherein the digital video data comprises MPEG-encoded video data.

6. A method of controlling frequency drift of a digital video tape drive during playback of recorded digital video data, the method comprising:

(a) retrieving from the digital video data a timing signal derived from a reference clock embedded in an original digital video signal from which the digital video data was recorded;

(b) deriving a long-term reference clock from the retrieved timing signal; and (c) synchronizing a drum motor of the digital video tape drive to the long-term reference clock during playback by:

(1) generating a drum speed signal corresponding to the rotational speed of the recording drum motor;

(2) generating from the drum speed signal a reference signal having a frequency approximately equal to the frequency of the long-term reference clock;

(3) frequency synchronizing the reference signal to the long-term reference clock; and (4) applying the synchronized reference signal to frequency synchronize the recording drum motor.

7. A digital video tape drive comprising:

(a) a helical scan recorder that records digital video data onto a recording medium;

(b) a receiver that receives the digital video data and isolates a reference clock corresponding to a first reference signal embedded in the digital video data;

(c) a long-term reference generator that creates a long-term reference clock from the isolated reference clock; and (d) a synchronizing circuit that synchronizes a recording drum motor of the helical scan recorder to the long-term reference clock, the synchronizing circuit including:

(1) a dividing circuit that receives a frequency signal generated by the drum motor and converts the frequency signal into a second reference signal having a frequency approximately equal to the frequency of the long-term reference clock; and (2) a frequency and phase synchronizing circuit that synchronizes the second reference signal to the long-term reference clock and applies the synchronized second reference signal to the drum motor to frequency and phase synchronize the drum motor.

8. The digital video tape drive of claim 7, wherein the long-term reference clock has a lower frequency than the reference clock.

9. The digital video tape drive of claim 7, further comprising a synchronizing circuit that synchronizes a capstan motor to the long-term reference signal during recording.

10. The digital video tape drive of claim 9, wherein the synchronizing circuit comprises:

(a) a dividing circuit that receives a frequency pulse signal generated by the capstan motor and converts the frequency pulse signal into a reference signal having a frequency approximately equal to the frequency of the long-term reference clock; and (b) a synchronizing circuit that synchronizes the reference signal to the long-term reference clock and applies the synchronized reference signal to synchronize to the capstan motor.

11. The digital video tape drive of claim 7, wherein the digital video data comprises MPEG-encoded video data.

* * * * *